United States Patent
Kowalevicz

(10) Patent No.: US 9,171,219 B2
(45) Date of Patent: Oct. 27, 2015

(54) METHODS AND APPARATUS FOR IMAGE FUSION

(71) Applicant: RAYTHEON COMPANY, Waltham, MA (US)

(72) Inventor: Andrew Kowalevicz, Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 566 days.

(21) Appl. No.: 13/713,949

(22) Filed: Dec. 13, 2012

(65) Prior Publication Data

US 2014/0169658 A1   Jun. 19, 2014

(51) Int. Cl.
| | |
|---|---|
| G06K 9/00 | (2006.01) |
| G06K 9/20 | (2006.01) |
| H04N 5/225 | (2006.01) |
| H04N 5/232 | (2006.01) |
| H04N 5/33 | (2006.01) |
| G02B 27/10 | (2006.01) |

(52) U.S. Cl.
CPC ............ *G06K 9/209* (2013.01); *H04N 5/2254* (2013.01); *H04N 5/23238* (2013.01); *H04N 5/332* (2013.01); *G02B 27/1066* (2013.01); *G06K 2009/2045* (2013.01)

(58) Field of Classification Search
CPC ............ G02B 27/1066; G02B 27/10; G02B 27/0905; G02B 27/0961; G02B 27/0955; G02B 27/095; G01S 3/784; G01S 5/16; G06K 2009/2045; G06K 9/209; G06K 9/20; H04N 5/23238; H04N 5/2254; H04N 5/332
See application file for complete search history.

(56) References Cited

U.S. PATENT DOCUMENTS

| | | | | | |
|---|---|---|---|---|---|
| 4,005,285 | A * | 1/1977 | Price | ................ | G02B 27/0927 250/208.1 |
| 5,629,492 | A * | 5/1997 | Gleason | ................ | F41G 1/38 359/488.01 |
| 6,231,194 | B1 * | 5/2001 | Raj | ................ | G02B 27/1066 353/122 |
| 6,281,486 | B1 * | 8/2001 | Holcombe | ........ | G02B 27/1066 250/208.1 |
| 6,344,893 | B1 * | 2/2002 | Mendlovic | ............. | G01C 3/08 235/462.22 |
| 6,775,049 | B1 * | 8/2004 | So | ............. | G06E 3/00 345/690 |
| 6,862,147 | B1 * | 3/2005 | Sonstroem | ............. | G02B 23/12 359/619 |
| 6,974,219 | B1 * | 12/2005 | Geneczko | ......... | G02B 27/0018 250/332 |
| 7,071,458 | B2 * | 7/2006 | Tsukamoto | ......... | G02B 6/4206 250/216 |
| 7,282,695 | B2 * | 10/2007 | Weber | ................ | G01S 17/42 250/203.1 |
| 7,411,733 | B2 * | 8/2008 | Toyoda | ............ | H01L 27/14621 250/208.1 |
| 7,576,791 | B2 * | 8/2009 | Sonstroem | ............. | G02B 13/14 250/352 |
| 7,609,289 | B2 * | 10/2009 | Rastegar | ............. | H04N 5/2259 348/218.1 |
| 8,110,791 | B2 * | 2/2012 | Laycock | ............. | G02B 6/06 250/227.2 |
| 8,248,515 | B2 * | 8/2012 | Ng | ....................... | G02B 3/0056 348/343 |
| 8,835,825 | B2 * | 9/2014 | Barkan | ............. | G06K 7/10722 235/472.01 |
| 9,018,575 | B2 * | 4/2015 | Kowalevicz | ............. | F41G 3/14 250/208.1 |
| 2009/0213467 | A1 * | 8/2009 | Mitra | ................ | G02B 3/0006 359/624 |
| 2010/0200736 | A1 * | 8/2010 | Laycock | ............. | G02B 6/06 250/227.2 |
| 2010/0283848 | A1 * | 11/2010 | Adler | ................ | G01S 17/66 348/143 |
| 2010/0295945 | A1 * | 11/2010 | Plemons | ............. | B60R 1/00 348/148 |
| 2014/0016016 | A1 * | 1/2014 | Berestov | ........... | H04N 5/23212 348/345 |
| 2014/0139630 | A1 * | 5/2014 | Kowalevicz | ........... | G03B 17/00 348/46 |
| 2014/0166854 | A1 * | 6/2014 | Kowalevicz | ............. | F41G 3/14 250/208.1 |
| 2014/0169658 | A1 * | 6/2014 | Kowalevicz | ........... | G06K 9/209 382/154 |
| 2015/0028188 | A1 * | 1/2015 | Kowalevicz | ...... | H01L 27/14625 250/208.1 |

* cited by examiner

*Primary Examiner* — John Lee
(74) *Attorney, Agent, or Firm* — Lando & Anastasi, LLP

(57) ABSTRACT

Systems and methods configured to implement sliced source imaging to produce a plurality of overlapping in-focus images on the same location of a single imaging detector without using beamsplitters.

19 Claims, 4 Drawing Sheets

METHODS AND APPARATUS FOR IMAGE FUSION

FEDERALLY SPONSORED RESEARCH

This invention was made with government support (Grant No. and federal agency withheld). The government of the United States has certain rights in this invention.

BACKGROUND

Image fusion, or the combination of multiple images of the same or similar scene(s), is used to achieve a higher resolution image of the scene, or an image containing more information about the scene than may be typically obtained from a single image of the scene. A traditional approach to image fusion uses software to digitally combine image data acquired from separate image sensors. This approach requires multiple image sensors, and optionally multiple optical sub-systems to direct electromagnetic radiation to each of the image sensors. The need for additional hardware (beyond a single image sensor and associated optics) as well as computational resources (to provide the digital image combination) increases the size, cost and power requirements of such systems. Another conventional approach to image fusion optically combines images using one or more beamsplitters. However, this approach leads to high transmission loss, possible coherence effects, and becomes difficult, if not impossible, as the image bandwidth increases.

SUMMARY OF INVENTION

Aspects and embodiments are directed to methods and apparatus for achieving image fusion at a single detector plane without requiring the use of beamsplitters or digital post-processing.

According to one embodiment, an imaging system comprises an imaging detector, a first optic configured to receive electromagnetic radiation representing a first image volume and to focus the electromagnetic radiation to form a first image at a focal plane of the imaging detector, and a second optic configured to form a second image at the focal plane of the imaging detector overlapping the first image, the second optic configured to receive electromagnetic radiation representing a second image volume, to slice the second image volume into a plurality of image slices and to reimage the plurality of image slices onto the focal plane of the imaging detector to reconstruct the second image, the second optic having an optical axis that is offset by a non-zero angle with respect to a surface normal of the imaging detector.

In one example the imaging detector is a focal plane array (FPA). In another example the second optic includes a structured relay optic configured to refocus each image slice such that a center of the image slice is coincident with the focal plane of the imaging detector at a height of the slice from the optical axis. The structured relay optic may include an array of mirrors or an array of lenses, for example. In one example the first optic has a first optical axis that is aligned with the surface normal of the imaging detector. The imaging system may further comprise a third optic configured to form a third image at the focal plane of the imaging detector overlapping the first and second images, the third optic configured to receive electromagnetic radiation representing a third image volume, to slice the third image volume into a plurality of second image slices and to reimage the plurality of second image slices onto the focal plane of the imaging detector to reconstruct the third image, the third optic having a third optical axis that is offset with respect to the surface normal of the imaging detector by an angular complement of the non-zero angle. The imaging system may further comprise at least one additional pair of optics positioned offset with respect to the surface normal of the imaging detector and configured to reconstruct a corresponding at least one pair of additional images at the focal plane of the imaging detector, the at least one pair of additional images being reconstructed from corresponding pluralities of additional image slices. In one example the first optic is configured to slice the first image volume into a plurality of first image slices and to reimage the plurality of first image slices onto the focal plane of the imaging detector to reconstruct the first image, the first optic having a first optical axis that is offset with respect to the surface normal of the imaging detector by an angular complement of the non-zero angle.

According to another embodiment a method of image fusion comprises forming a first image at a focal plane of an imaging detector, segmenting a source image volume into a plurality of image slices, each image slice having an image volume, individually reimaging the plurality of image slices onto the focal plane of the imaging detector at an angle of incidence that is offset by a non-zero value with respect to a surface normal of the imaging detector such that the image volume of each image slice overlaps the focal plane, reconstructing a substantially in-focus second image at the focal plane from the plurality of image slices, and fusing the first and second images to produce a fused image.

In one example forming the first image includes focusing electromagnetic radiation along a first optical axis aligned with the surface normal of the imaging detector to produce the first image at the focal plane. In another example individually reimaging the plurality of image slices onto the focal plane includes refocusing each image slice such that a center of the image slice is coincident with the focal plane. The method may further comprise setting a magnification of the first image to be approximately equal to a magnification of the second image.

According to another embodiment, a method of image fusion comprising forming a first image at a focal plane of an imaging detector at a first angle of incidence aligned with a surface normal of the imaging detector, and forming at least one second image at the focal plane of the imaging detector at a second angle of incidence offset from the surface normal of the imaging detector by a non-zero offset value, the at least one second image being substantially in focus and overlapping the first image.

The method may further comprise fusing the first image and the at least one second image to produce a fused image. In one example forming the at least one second image includes forming at least one pair of second images, the angle of incidence of one second image of the pair being an angular complement of the angle of incidence of the other second image of the pair. In another example forming the at least one second image includes forming a plurality of pairs of second images at the focal plane of the imaging detector. The method may further comprise setting a magnification of all second images to be equal to a magnification of the pair of second images having the angle of incidence with a largest non-zero offset value. In one example forming the at least one second image includes segmenting a source image volume into a plurality of image slices, each image slice having an image volume, individually reimaging the plurality of image slices onto the focal plane of the imaging detector at the angle of incidence that is offset by the non-zero offset value with respect to the surface normal of the imaging detector such that the image volume of each image slice overlaps the focal plane, and reconstructing the at least one second image at the focal plane from the plurality of image slices.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to an imaging system that is capable of fusing multiple images on one imaging sensor plane without requiring the use of beamsplitters. Conventional imaging requires that the optical axis of the imaging system align to the surface normal of the imaging detector in order to keep the image in focus. Aspects and embodiments are directed to the use of "sliced source" imaging techniques in which this requirement of normal incidence is relaxed and images may be formed, in-focus, at non-normal angles of incidence on the detector plane. Using sliced-source imaging techniques, the object or an image of the object is divided into a series of slices that are individually reimaged onto a tilted image plane. The imaging detector, aligned with this tilted image plane, reconstructs an in-focus image from the series of slices, as discussed further below. Thus, since the imaging detector is able to obtain in-focus images from electromagnetic radiation incident at many different angles, not limited to normal incidence, multiple images from different view angles may be combined at a single image plane with no relative distortion, and without requiring the digital post-processing associated with fusing images from different sensors as is done in conventional systems.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
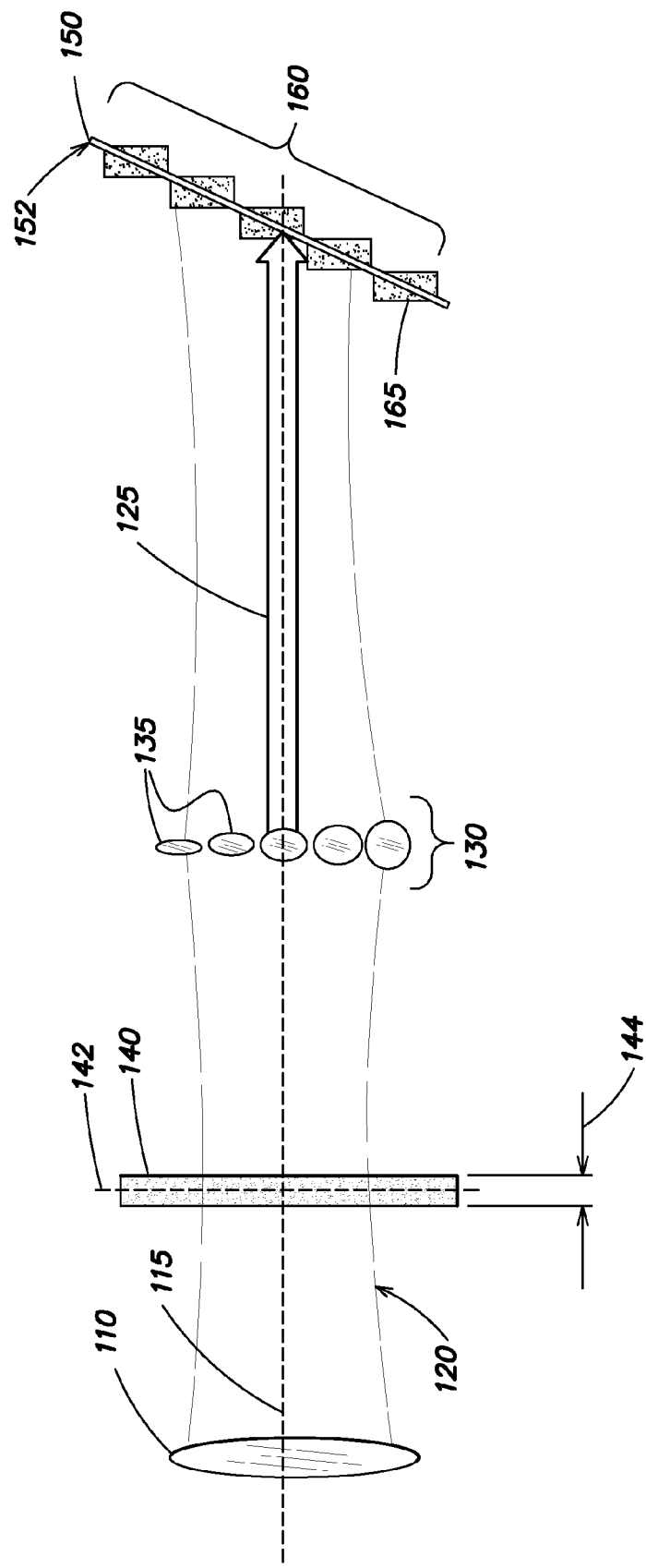
FIG. 1 is a diagram of one example of sliced source optical imaging system in which the imaging detector is tilted with respect to the optical axis of the system according to aspects of the invention.

Referring to FIG. 1, there is illustrated one example of an imaging system configured to implement sliced source imaging techniques, allowing a substantially in-focus image to be produced on a tilted or rotated imaging detector 150. Fore-optics 110 directs incident electromagnetic radiation 120 into the imaging system toward a relay optic 130. An image 140 of a distant object or scene is formed by the fore-optics 110 at a first image plane 142, and is reimaged by the relay optic 130 onto the tilted imaging detector 150 that is aligned and coincident with a second, tilted image plane 152. The relay optic 130 focuses the reimaged electromagnetic radiation 125 onto the imaging detector 150. As shown in FIG. 1, the imaging detector 150 is tilted with respect to the optical axis 115 of the imaging system. The imaging detector 150 may be a focal plane array (FPA), for example. Foreoptics 110 may be any type of optical element, including any number of lenses and/or mirrors, or merely an entrance aperture, as will be readily appreciated by those skilled in the art, given the benefit of this disclosure.

As discussed above, in one embodiment, the image volume 144 of the image 140 is divided into a series of slices 165 that are individually reimaged by the relay optic 130 onto the tilted imaging detector 150, providing a segmented image volume 160 that overlaps the tilted imaging detector, as illustrated in FIG. 1. According to one embodiment, the relay optic 130 is configured to refocus each slice 165 such that the center of the slice is coincident with the focal plane of the imaging detector 150 at the height of the slice from the optical axis 115. Since the focal plane is tilted, the relative focal distances between adjacent slices progresses in discrete steps from the bottom of the focal plane to the top. Provided that the tilt of the imaging detector 150 relative to the optical axis 115 is not excessive, the difference in the component of distance along the optical axis of the focal plane will not vary by more than the depth of focus over the height of the slice 165. In this case, each entire slice 165 remains in focus on the focal plane of the imaging detector 150, and since each slice is thus positioned, the image 140 may be faithfully reproduced on the tilted focal plane. In this manner, a substantially complete overlap may be achieved between the tilted imaging detector 150 and the reconstructed image volume 160 comprised of the plurality of slices 165. Thus, substantially the entire image formed at the imaging detector 150 may be in focus. The only distortion of the reconstructed image on the imaging detector 150 is a linear magnification equal to $1/\cos(\theta)$ where $\theta$ is the angle between the optical axis 115 and the surface normal of the imaging detector 150. This approach enables access to the imaging detector 150 from directions other than along the optical axis 115, and thus the capability to project multiple images onto the same plane, as discussed further below.

The relay optic 130 may be implemented in numerous ways, for example, using an array of lenses and/or or mirrors. In one embodiment the relay optic 130 is segmented into elements 135 as shown in FIG. 1. In one example, each element 135 of the relay optic 130 has the same reflecting angle, but with a uniform progression of delay distances relative to one another such that the image slices have different optical path lengths, as discussed above.

However, in other examples the reflecting angles may be different. In one example, the relay optic 130 is a lenslet array comprised of a plurality of lenslets each having a different focal length. In this example, since each lenslet has a different focal length, each lenslet forms an image portion (corresponding to a slice 165) at a slightly different distance from the relay optic 130. The focal lengths of the lenslets may be selected such that the distances at which the image slices 165 are formed corresponds to the tilt of the imaging detector 150, and the depth of focus of each slice overlaps the imaging detector 150, as illustrated in FIG. 1 and discussed above. In other examples, depending on the overall optical design, the focal length of the lenslets may be the same. Furthermore, in other examples, the relay optic 130 may be constructed using optical elements other than lenses, such as a faceted or stepped mirror, an array of mirrors, or a deformable mirror or mirror array, for example. The relay optic 130 may be implemented in numerous different ways and, regardless of physical implementation, functions to "slice" the source image and reimage each of the slices individually onto a rotated image plane such that a substantially in-focus reconstruction of the entire image is obtained, while substantially eliminating retro-reflection from the system.

Various embodiments, examples, and demonstrations of sliced source imaging systems and methods are discussed in commonly-owned, co-pending U.S. application Ser. No. 13/680,950 filed on Nov. 19, 2012 and titled "METHODS AND APPARATUS FOR IMAGING WITHOUT RETRO-REFLECTION," which is incorporated herein by reference in its entirety. Any of these embodiments or examples may be used to implement the optical imaging systems discussed herein.

Figure 2:
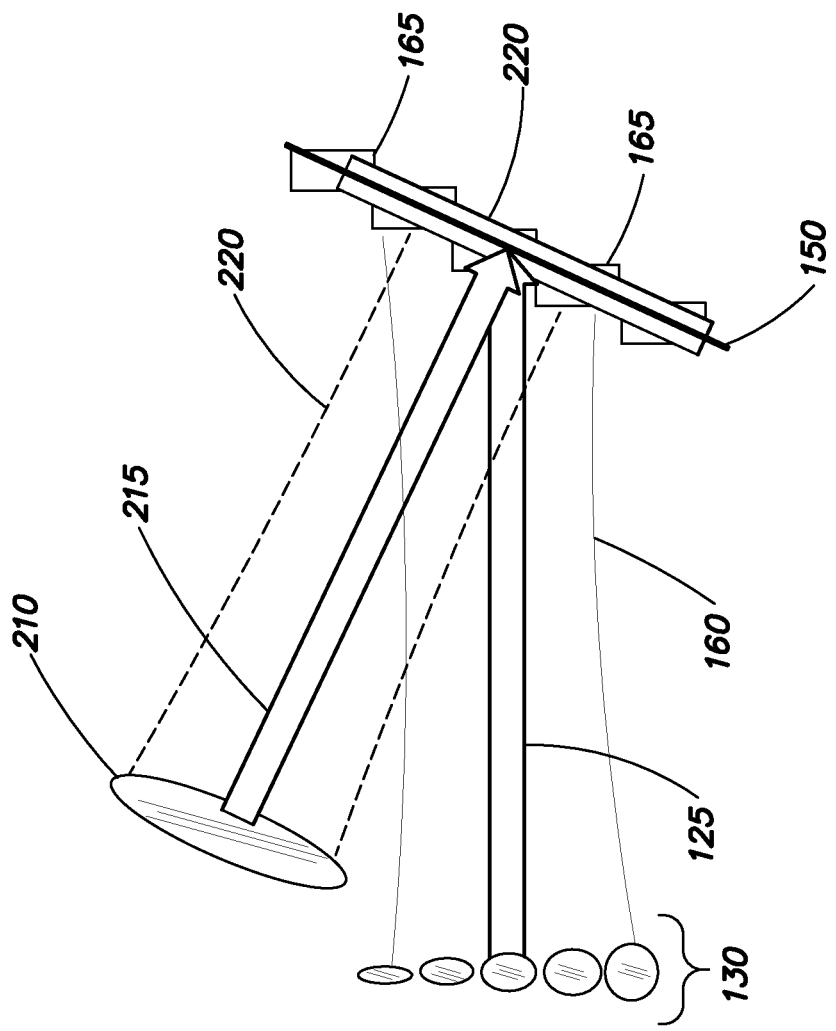
FIG. 2 is a diagram of example of an image fusion technique using sliced source imaging according to aspects of the invention.

As discussed above, using sliced source imaging techniques allows access to the imaging detector 150 from multiple directions or view angles. Accordingly, multiple optics may be used to project multiple images of a scene onto the same plane, or onto a single imaging detector, where they can be combined to produced a fused image. FIG. 2 illustrates an example of a system configured to use sliced source imaging to achieve image fusion in this manner. Image fusion may be performed by the imaging detector 150 or by a processor, or other computing device capable of image processing, coupled to the imaging detector 150.

Referring to FIG. 2, a primary optic 210 is arranged to focus electromagnetic radiation 215 along an optical axis coincident with the surface normal of the imaging detector 150. Thus, the primary optic 210 produces a first (non-segmented) image 220 at the imaging detector 150. A second optic configured to implement sliced-source imaging and including the relay optic 130 is position off-axis with respect to the surface normal of the imaging detector 150, and produces the reconstructed image 160 (comprised of the plurality of slices 165) at the imaging detector, as discussed above. Thus, the primary optic 210 and the relay optic 130 form in-focus and overlapping images 160, 220 at the imaging detector 150. These images 160, 220 may be combined (or fused) using any of numerous well-known image fusion techniques, as will be understood and appreciated by those skilled in the art, given the benefit of this disclosure.

According to one embodiment, the images 160, 220 may be maintained in focus on the imaging detector 150 and with no relative distortion by coordinating the magnification of each image along the elongated direction to be the same, regardless of the angle of incidence on the electromagnetic radiation 125, 215. For example, this may be achieved by setting the magnification of the projection of the image on the focal plane of the imaging detector 150 to that of the image with the largest angle of incidence. Thus, in the two-image example of FIG. 2, the primary optic 210 may be configured to impart a magnification to the image 220 that is equal to the magnification of the image 160 that is caused by its angle of incidence relative to the surface normal of the imaging detector (namely $1/\cos(\theta)$, as discussed above).

Figure 3:
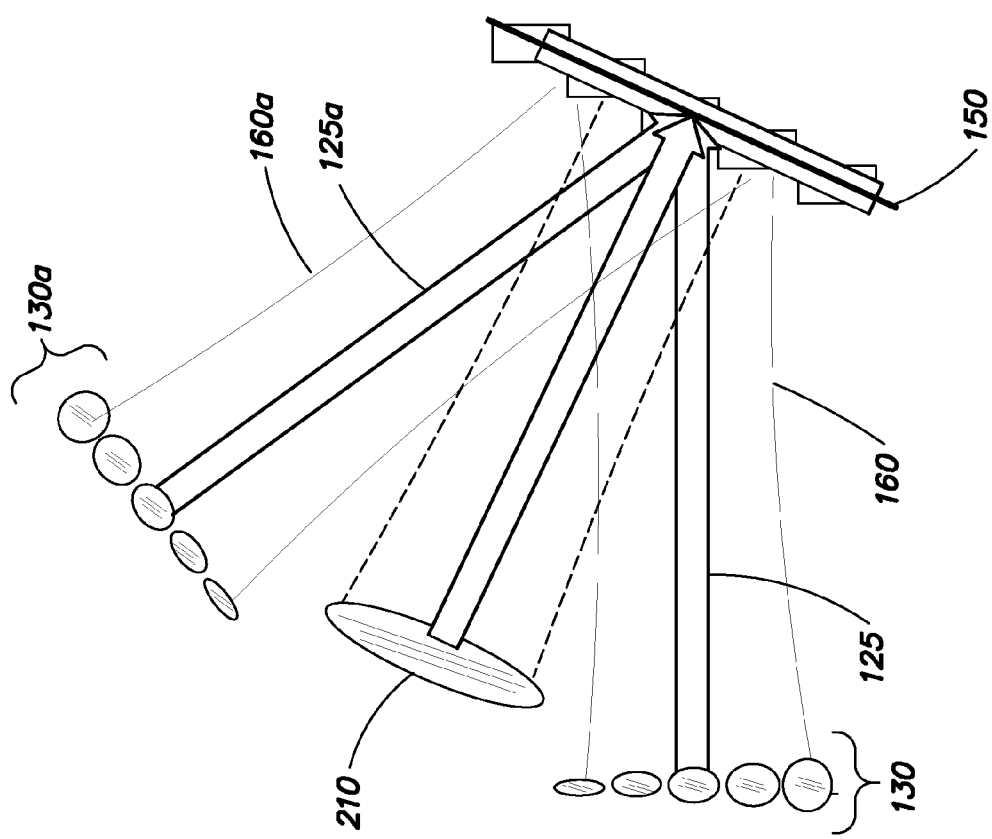
FIG. 3 is a diagram of another example of an image fusion technique using sliced source imaging according to aspects of the invention.

Referring to FIG. 3, in another embodiment, a third optic 130a also configured to implement sliced-source imaging may be positioned at the angular complement of the second optic 130. This third optic 130a focused electromagnetic radiation 125a onto the imaging detector to reconstruct a third image 160a at the imaging detector 150. This third image 160a comprises a plurality of slices (not shown) similar to the image 160 reconstructed by the second optic 130. If the optics 130 and 130a are positioned in a common plane, the angles of incidence of electromagnetic radiation 125 and 125a are the same (but in opposite directions) relative to the surface normal of the imaging detector 150, and the optics 130, 130a are substantially the same, there will be no relative distortion between the images 160 and 160a. In one example, an optical imaging system may be constructed using the optics 130 and 130a positioned at angular complements as shown in FIG. 3, without including the primary optic 210.

Figure 4A:
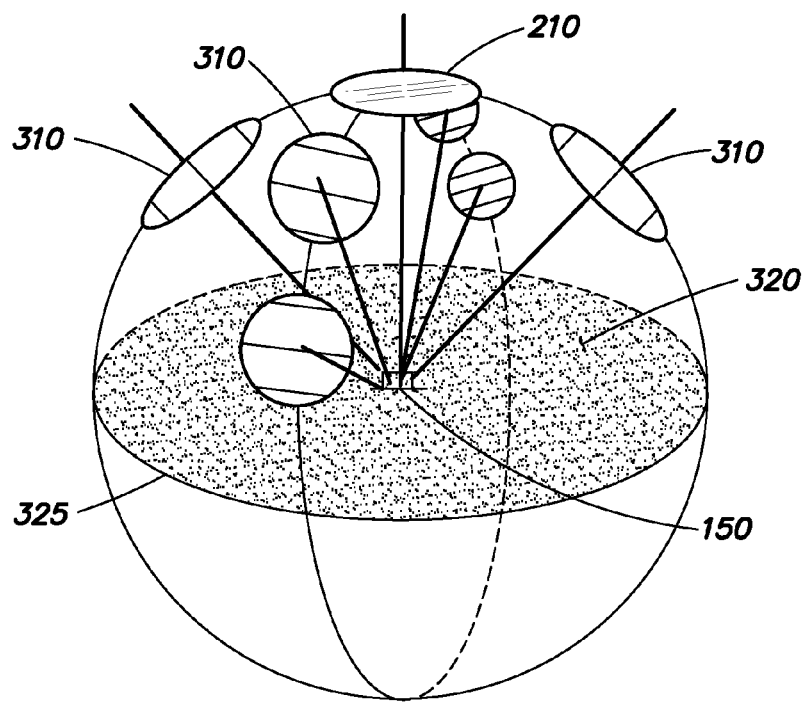
FIG. 4A is a diagram illustrating one example of an image fusion system including multiple source images according to aspects of the invention.
Figure 4B:
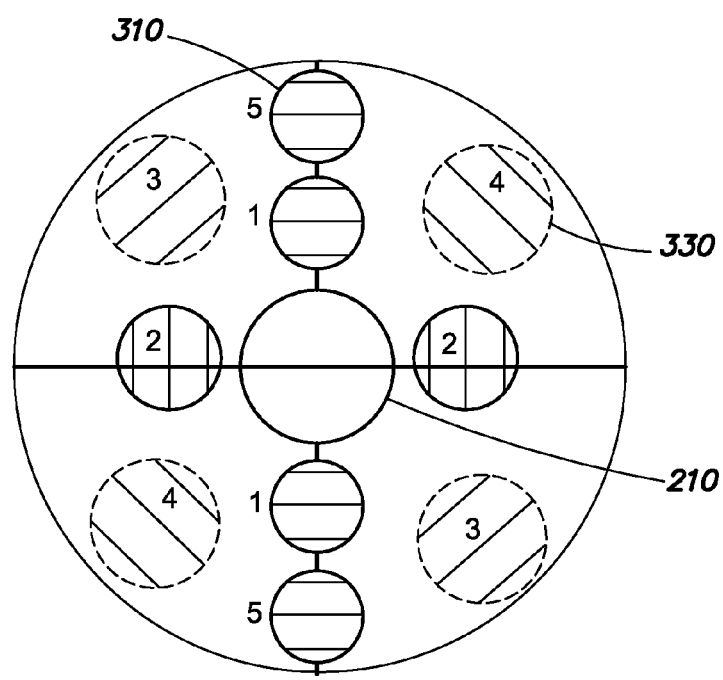
FIG. 4B is a plan view of the system of FIG. 4A, also illustrating some additional sliced source optics according to aspects of the invention.

The concept of performing image fusion using sliced-source imaging may be extended from the examples shown in FIGS. 2 and 3 to include multiple pairs of sliced-source optics, as illustrated in FIGS. 4A and 4B. Multiple pairs of optics 310, 330 may be positioned about the primary optic 210 such that each focuses electromagnetic radiation onto the imaging detector 150 with a certain angle of incidence relative to the surface normal of the imaging detector. Referring to FIG. 4A, the plane 320 bounded by equatorial line 325 represents the location of the image plane with which the imaging detector 150 is aligned. Each optic 310 or 330 may include a structured relay optic 130 and be configured to implement the sliced-source imaging techniques discussed above so as to reconstruct in-focus images on the image plane 320. Although not shown in FIGS. 4A and 4B, it will be appreciated by those skilled in the art, given the benefit of this disclosure, that any one or more of the optics 210, 310, 330 may share common foreoptics and/or a common entrance aperture, or may have their own associated foreoptics and/or entrance apertures.

Referring to FIG. 4B, the sliced-source optics 310, 330 may be arranged in pairs (1, 2, 3, 4, and 5), each pair including two optics positioned at complementary angles relative to the primary optic 210 and the surface normal of the imaging detector 150, as discussed above. Accordingly, there is no relative distortion between the images produced by each optic 310 or 330 of a given pair. Various methods may be used to correct for relative distortion across numbered pairs. For example, linear distortion, caused by image magnification, between the images produced by different pairs along a common equatorial line (e.g., between the image from the primary optic 210, the images from pair 1 and the images from pair 5) may be eliminated by configuring the optics 310, 210 to set the magnifications to be that of the pair with the largest angle of incidence (e.g., pair 5), as discussed above. In some examples, different optics pairs (e.g., pair 1 and pair 2) may be configured to use different wavelengths of electromagnetic radiation for imaging. In such examples, the imaging detector 150 may be a multi-wavelength detector configured for imaging in one or more spectral bands. The use of different wavelength ranges, for example, visible and longwave infrared (LWIR), may be beneficial since it may allow a fused image to be produced containing more information than is obtainable by imaging in a single spectral band. In addition, knowledge of the location (relative to the surface normal to the imaging detector 150, for example) of optics configured for a given wavelength or range of wavelengths, may be used to apply digital processing to correct for relative distortion between the images from different numbered pairs. In other example, some level of relative distortion between images may be acceptable (i.e., image fusion may be performed even with the relative distortion present) such that no correction is necessary.

Thus, aspects and embodiments may provide optical imaging systems that are capable of forming multiple overlapping in-focus images on a common imaging detector to allow image fusion techniques to be applied to the images. Sliced source imaging provides the ability to form an in-focus image on a focal plane that is rotated with respect to the optical axis (i.e., at an angle of incidence offset from the surface normal of the imaging detector), and thereby allows access to the imaging detector from multiple angles of incidence. As a result, an arbitrary number of images may be combined on the same location of a single imaging detector without the need for digital post-processing, and without the need for beamsplitters or any of the drawbacks associated with them. Thus, neither the image quality nor the light throughput of the system may degrade with an increase in bandwidth or with the number of imaging being overlapped.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An imaging system comprising:
   an imaging detector;
   a first optic configured to receive electromagnetic radiation representing a first image volume and to focus the electromagnetic radiation to form a first image at a focal plane of the imaging detector; and
   a second optic configured to form a second image at the focal plane of the imaging detector overlapping the first image, the second optic configured to receive electromagnetic radiation representing a second image volume, to slice the second image volume into a plurality of image slices and to reimage the plurality of image slices onto the focal plane of the imaging detector to reconstruct the second image, the second optic having an optical axis that is offset by a non-zero angle with respect to a surface normal of the imaging detector.

2. The imaging system of claim 1, wherein the imaging detector is a focal plane array (FPA).

3. The imaging system of claim 1, wherein the second optic includes a structured relay optic configured to refocus each image slice such that a center of the image slice is coincident with the focal plane of the imaging detector at a height of the slice from the optical axis.

4. The imaging system of claim 3, wherein the structured relay optic includes an array of mirrors.

5. The imaging system of claim 3, wherein the structured relay optic includes an array of lenses.

6. The imaging system of claim 1, wherein the first optic has a first optical axis that is aligned with the surface normal of the imaging detector.

7. The imaging system of claim 6, further comprising:
   a third optic configured to form a third image at the focal plane of the imaging detector overlapping the first and second images, the third optic configured to receive electromagnetic radiation representing a third image volume, to slice the third image volume into a plurality of second image slices and to reimage the plurality of second image slices onto the focal plane of the imaging detector to reconstruct the third image, the third optic having a third optical axis that is offset with respect to the surface normal of the imaging detector by an angular complement of the non-zero angle.

8. The imaging system of claim 7, further comprising at least one additional pair of optics positioned offset with respect to the surface normal of the imaging detector and configured to reconstruct a corresponding at least one pair of additional images at the focal plane of the imaging detector, the at least one pair of additional images being reconstructed from corresponding pluralities of additional image slices.

9. The imaging system of claim 1, wherein the first optic is configured to slice the first image volume into a plurality of first image slices and to reimage the plurality of first image slices onto the focal plane of the imaging detector to reconstruct the first image, the first optic having a first optical axis that is offset with respect to the surface normal of the imaging detector by an angular complement of the non-zero angle.

10. A method of image fusion comprising:
    forming a first image at a focal plane of an imaging detector;
    segmenting a source image volume into a plurality of image slices, each image slice having an image volume;
    individually reimaging the plurality of image slices onto the focal plane of the imaging detector at an angle of incidence that is offset by a non-zero value with respect to a surface normal of the imaging detector such that the image volume of each image slice overlaps the focal plane;
    reconstructing a substantially in-focus second image at the focal plane from the plurality of image slices; and
    fusing the first and second images to produce a fused image.

11. The method of claim 10, wherein forming the first image includes focusing electromagnetic radiation along a first optical axis aligned with the surface normal of the imaging detector to produce the first image at the focal plane.

12. The method of claim 11, wherein individually reimaging the plurality of image slices onto the focal plane includes refocusing each image slice such that a center of the image slice is coincident with the focal plane.

13. The method of claim 11, further comprising setting a magnification of the first image to be approximately equal to a magnification of the second image.

14. A method of image fusion comprising:
    forming a first image at a focal plane of an imaging detector at a first angle of incidence aligned with a surface normal of the imaging detector; and forming at least one second image at the focal plane of the imaging detector at a second angle of incidence offset from the surface normal of the imaging detector by a non-zero offset value, the at least one second image being substantially in focus and overlapping the first image.

15. The method of claim 14, further comprising fusing the first image and the at least one second image to produce a fused image.

16. The method of claim 14, wherein forming the at least one second image includes forming at least one pair of second images, the angle of incidence of one second image of the pair being an angular complement of the angle of incidence of the other second image of the pair.

17. The method of claim 16, wherein forming the at least one second image includes forming a plurality of pairs of second images at the focal plane of the imaging detector.

18. The method of claim 17, further comprising setting a magnification of all second images to be equal to a magnification of the pair of second images having the angle of incidence with a largest non-zero offset value.

19. The method of claim 14, wherein forming the at least one second image includes:
  segmenting a source image volume into a plurality of image slices, each image slice having an image volume;
  individually reimaging the plurality of image slices onto the focal plane of the imaging detector at the angle of incidence that is offset by the non-zero offset value with respect to the surface normal of the imaging detector such that the image volume of each image slice overlaps the focal plane; and
  reconstructing the at least one second image at the focal plane from the plurality of image slices.

* * * * *